(12) United States Patent
Mahdavi et al.

(10) Patent No.: US 9,571,014 B2
(45) Date of Patent: Feb. 14, 2017

(54) DRIVE CIRCUIT FOR AN AIR BEARING MOTOR

(71) Applicant: Liebherr-Elektronik GmbH, Lindau (DE)

(72) Inventors: Nejat Mahdavi, Lindau (DE); Ralf Cremer, Lindau (DE); Pierre Brodeau, Toulouse (FR)

(73) Assignee: LIEBHERR-ELEKTRONIK GMBH, Lindau (Bodensee) (DE)

( * ) Notice: Subject to any disclaimer, the term of this patent is extended or adjusted under 35 U.S.C. 154(b) by 63 days.

(21) Appl. No.: 14/474,672

(22) Filed: Sep. 2, 2014

(65) Prior Publication Data

US 2015/0130384 A1    May 14, 2015

(30) Foreign Application Priority Data

Aug. 30, 2013   (DE) .................. 10 2013 014 427

(51) Int. Cl.
| | |
|---|---|
| *H02P 1/00* | (2006.01) |
| *H02P 31/00* | (2006.01) |
| *H02P 4/00* | (2006.01) |
| *H02J 1/10* | (2006.01) |
| *H02J 7/34* | (2006.01) |
| *H02J 9/06* | (2006.01) |
| *H02P 23/00* | (2016.01) |
| *B60L 1/00* | (2006.01) |

(Continued)

(52) U.S. Cl.
CPC ............ *H02P 4/00* (2013.01); *B60L 1/003* (2013.01); *B60L 9/00* (2013.01); *B60L 11/005* (2013.01); *B60L 11/1868* (2013.01); *H02J 1/10* (2013.01); *H02J 7/34* (2013.01); *H02J 7/345* (2013.01); *H02J 9/06* (2013.01); *H02P 23/00* (2013.01); *H02P 29/025* (2013.01); *B60L 2200/26* (2013.01); *B60L 2210/10* (2013.01); *B60L 2210/40* (2013.01); *B60L 2220/50* (2013.01); *B60L 2240/34* (2013.01); *Y02T 10/642* (2013.01)

(58) Field of Classification Search
CPC ............ Y10T 307/625; Y10T 307/615; Y10T 307/653; Y10T 307/658; Y10T 307/675; Y10T 307/696; Y10T 307/724; B60L 3/0046; B60L 11/1868; B60L 2200/26; B60L 2210/10; B60L 2210/20; B60L 2210/40
USPC .......... 318/139, 442; 307/10.6, 10.7, 64, 66; 290/52; 429/429; 320/134, 137
See application file for complete search history.

(56) References Cited

U.S. PATENT DOCUMENTS

| | | | | |
|---|---|---|---|---|
| 3,989,990 | A | * | 11/1976 | Thompson ............... B60L 7/10 318/139 |
| 4,052,647 | A | * | 10/1977 | Thompson ............. B60L 15/04 318/139 |

(Continued)

FOREIGN PATENT DOCUMENTS

| | | |
|---|---|---|
| DE | 1 613 048 A | 5/1970 |
| DE | 33 04 377 A1 | 8/1984 |

(Continued)

*Primary Examiner* — Paul Ip
(74) *Attorney, Agent, or Firm* — Dilworth & Barrese, LLP.

(57) ABSTRACT

The invention relates to a drive circuit for an electric motor having an aerodynamic bearing of the motor shaft, wherein the drive circuit comprises at least one storage means for storing electrical energy by which the electric motor can be fed with electrical energy on a failure of the supply voltage or DC-link voltage to obtain a minimum speed of the motor shaft required for the air support at least at times.

20 Claims, 3 Drawing Sheets

(51) Int. Cl.
*H02P 29/02* (2016.01)
*B60L 9/00* (2006.01)
*B60L 11/00* (2006.01)
*B60L 11/18* (2006.01)

(56) References Cited

U.S. PATENT DOCUMENTS

| | | | | |
|---|---|---|---|---|
| 4,315,162 A * | 2/1982 | Ferguson | G06F 1/263 | 307/66 |
| 4,795,914 A * | 1/1989 | Higa | H02J 9/061 | 307/64 |
| 5,034,622 A * | 7/1991 | Kuzmik | H02H 1/0084 | 307/149 |
| 5,350,992 A * | 9/1994 | Colter | H02P 1/44 | 318/805 |
| 5,371,793 A * | 12/1994 | Kimura | G06K 19/073 | 235/379 |
| 5,456,407 A * | 10/1995 | Stalsberg | G05D 23/1917 | 219/501 |
| 5,457,365 A * | 10/1995 | Blagaila | G06F 1/305 | 307/130 |
| 5,658,132 A * | 8/1997 | Akazawa | B60H 1/3222 | 318/803 |
| 5,668,463 A * | 9/1997 | Duley | H01M 10/46 | 307/66 |
| 5,866,023 A * | 2/1999 | Monson | G06K 1/121 | 235/383 |
| 5,878,189 A * | 3/1999 | Lankin | H02P 7/2985 | 318/432 |
| 5,880,537 A * | 3/1999 | Windhorn | H02J 9/066 | 307/64 |
| 6,009,344 A * | 12/1999 | Flower | A61N 1/30 | 604/20 |
| 6,021,251 A * | 2/2000 | Hammer | H02P 7/2913 | 318/432 |
| 6,031,965 A * | 2/2000 | Hammer | H02P 7/2985 | 318/432 |
| 6,064,122 A * | 5/2000 | McConnell | F02C 7/268 | 290/32 |
| 6,064,937 A * | 5/2000 | Yang | B60K 31/00 | 180/2.2 |
| 6,184,593 B1 * | 2/2001 | Jungreis | H02J 9/062 | 307/64 |
| 6,215,279 B1 * | 4/2001 | Rakovski | H01M 10/46 | 307/66 |
| 6,348,777 B1 * | 2/2002 | Brown | H02J 7/0091 | 320/137 |
| 6,359,794 B1 * | 3/2002 | Real | H02J 9/062 | 307/66 |
| 6,703,719 B1 * | 3/2004 | McConnell | F01D 15/10 | 290/52 |
| 6,827,182 B2 * | 12/2004 | Araki | B66B 5/027 | 187/290 |
| 7,339,347 B2 * | 3/2008 | Elder | B60L 3/0046 | 307/10.7 |
| 7,427,865 B2 * | 9/2008 | Elder | B60L 3/0046 | 180/65.31 |
| 7,567,057 B2 * | 7/2009 | Elder | B60L 3/0046 | 307/10.6 |
| 7,572,108 B2 * | 8/2009 | Koehl | F04D 15/0088 | 417/44.1 |
| 7,612,510 B2 * | 11/2009 | Koehl | F04D 15/0088 | 318/254.1 |
| 7,681,395 B2 * | 3/2010 | Pinkerton | F02C 6/16 | 60/646 |
| 7,686,587 B2 * | 3/2010 | Koehl | F04D 15/0088 | 417/12 |
| 7,704,051 B2 * | 4/2010 | Koehl | F04D 15/0088 | 417/42 |
| 7,751,159 B2 * | 7/2010 | Koehl | F04D 15/0088 | 318/490 |
| 7,815,420 B2 * | 10/2010 | Koehl | F04D 15/0088 | 417/44.1 |
| 7,821,215 B2 * | 10/2010 | Koehl | F04D 15/0088 | 318/280 |
| 7,834,583 B2 * | 11/2010 | Elder | B60L 3/0046 | 307/10.7 |
| 7,839,117 B2 * | 11/2010 | Elder | B60L 3/0046 | 307/10.7 |
| 7,845,459 B2 * | 12/2010 | Kasai | B62D 5/046 | 180/407 |
| 7,857,600 B2 * | 12/2010 | Koehl | F04D 15/0088 | 417/44.11 |
| 7,973,499 B2 * | 7/2011 | Yoshioka | B60L 11/18 | 318/139 |
| 7,976,284 B2 * | 7/2011 | Koehl | F04D 15/0088 | 417/42 |
| 7,983,877 B2 * | 7/2011 | Koehl | F04D 15/0088 | 702/185 |
| 7,990,091 B2 * | 8/2011 | Koehl | F04D 15/0088 | 318/432 |
| 8,177,033 B2 * | 5/2012 | Kauppinen | B66B 1/30 | 187/290 |
| 8,444,394 B2 * | 5/2013 | Koehl | F04D 15/0088 | 318/453 |
| 8,540,493 B2 * | 9/2013 | Koehl | F04D 15/0088 | 417/43 |
| 2003/0052544 A1 * | 3/2003 | Yamamoto | B66B 5/02 | 307/66 |
| 2003/0106332 A1 * | 6/2003 | Okamoto | B60H 1/00428 | 62/239 |
| 2004/0035646 A1 * | 2/2004 | Araki | B66B 5/027 | 187/290 |
| 2004/0041404 A1 * | 3/2004 | McConnell | F01D 15/10 | 290/52 |
| 2005/0035737 A1 * | 2/2005 | Elder | B60L 3/0046 | 320/103 |
| 2005/0035741 A1 * | 2/2005 | Elder | B60L 3/0046 | 320/116 |
| 2005/0123408 A1 * | 6/2005 | Koehl | F04D 15/0088 | 417/53 |
| 2006/0152085 A1 * | 7/2006 | Flett | B60L 9/30 | 307/75 |
| 2007/0022755 A1 * | 2/2007 | Pinkerton | F02C 6/16 | 60/646 |
| 2008/0063535 A1 * | 3/2008 | Koehl | F04D 15/0088 | 417/18 |
| 2008/0111557 A1 * | 5/2008 | Elder | B60L 3/0046 | 324/511 |
| 2008/0131286 A1 * | 6/2008 | Koehl | F04D 15/0088 | 417/12 |
| 2008/0131289 A1 * | 6/2008 | Koehl | F04D 15/0088 | 417/32 |
| 2008/0131291 A1 * | 6/2008 | Koehl | F04D 15/0088 | 417/44.1 |
| 2008/0131294 A1 * | 6/2008 | Koehl | F04D 15/0088 | 417/53 |
| 2008/0131295 A1 * | 6/2008 | Koehl | F04D 15/0088 | 417/53 |
| 2008/0131296 A1 * | 6/2008 | Koehl | F04D 15/0088 | 417/53 |
| 2008/0140353 A1 * | 6/2008 | Koehl | F04D 15/0088 | 702/185 |
| 2008/0181785 A1 * | 7/2008 | Koehl | F04D 15/0088 | 417/12 |
| 2008/0181787 A1 * | 7/2008 | Koehl | F04D 15/0088 | 417/42 |
| 2008/0181789 A1 * | 7/2008 | Koehl | F04D 15/0088 | 417/44.11 |
| 2008/0260540 A1 * | 10/2008 | Koehl | F04D 15/0088 | 417/44.2 |
| 2008/0277191 A1 * | 11/2008 | Kasai | B62D 5/046 | 180/444 |
| 2008/0315686 A1 * | 12/2008 | Elder | B60L 3/0046 | 307/66 |
| 2008/0315837 A1 * | 12/2008 | Elder | B60L 3/0046 | 320/134 |

(56) References Cited

U.S. PATENT DOCUMENTS

| | | | |
|---|---|---|---|
| 2009/0261761 A1* | 10/2009 | Yoshioka | B60L 11/18 318/139 |
| 2009/0293523 A1* | 12/2009 | Bittner | F25B 25/005 62/236 |
| 2011/0065012 A1* | 3/2011 | Kwon | H01M 8/04253 429/429 |
| 2011/0290593 A1* | 12/2011 | Kauppinen | B66B 1/30 187/290 |

FOREIGN PATENT DOCUMENTS

| | | |
|---|---|---|
| DE | 195 26 291 A1 | 1/1996 |
| DE | 100 37 077 A1 | 2/2002 |
| DE | 20 2007 009 660 A1 | 10/2007 |
| DE | 10 2008 001 112 A1 | 8/2009 |
| DE | 10 2008 019 683 A1 | 10/2009 |
| DE | 10 2008 027 697 A1 | 12/2009 |
| DE | 10 2010 041 065 A1 | 3/2012 |

* cited by examiner

DRIVE CIRCUIT FOR AN AIR BEARING MOTOR

BACKGROUND OF THE INVENTION

The invention relates to a drive circuit for an electric motor having an aerodynamic bearing of the motor shaft.

Air bearings are bearings in which two parts moving against one another are separated by a thin air film. They thereby allow an almost friction-free relative movement.

The air bearing can in particular be used with electric motors in which the driven motor shaft, i.e. the rotor, is supported by an air gap in the motor housing. A distinction is made between static bearings and dynamic bearings in air bearings. With static bearings, the air gap is generated by introduction of compressed air by external means. Dynamic bearings do not require any compressed air supply since the compressed air required in the air gap is generated by inherent movement. The problem arises here, however, that the two bearing parts which move with respect to one another can contact one another below a characteristic relative speed and are thus subject to wear and increased friction.

Air bearing motors are used, for example, in air-conditioning units, in particular in air-conditioning units for rail vehicles. The air bearing motors are coupled to a compressor and drive it. Since the air-conditioning system, like other consumers within the rail vehicle, are fed by the supply voltage of the overhead line, this voltage supply can be briefly interrupted at specific transition points. Depending on the interruption period, this can have the result that the speed of the air bearing motors in air-conditioning units is abruptly reduced, down to a standstill, and sufficient compressed air for the air bearing cannot be generated. Harmful friction phenomena thereby arise within the air bearings and the service life of the motor is greatly reduced.

SUMMARY OF THE INVENTION

The present invention has therefore set itself the object of showing a solution which prevents the loss of air pressure and of speed within the air-supported motor on a brief or certain interruption of the supply voltage and consequently reduces the wear of the air bearing.

This object is achieved by the drive circuit in accordance with the features herein. Advantageous embodiments of the drive circuit are the subject of the features herein.

In accordance with the invention, a drive circuit for an electric motor is proposed having aerodynamic bearing of the motor shaft or rotor shaft. In accordance with the invention, the drive circuit provides at least one storage means for storing electrical energy. The stored energy of the at least one electrical storage means should now be utilized to maintain an emergency operation of the electric motor on a failure of the actual supply voltage. The electric motor can therefore be fed at least at times via the stored electrical energy of the at least one storage means on a voltage drop in order to be able to maintain a minimum speed of the motor shaft or rotor shaft. The minimum speed is selected so a satisfactory air bearing of the motor shaft is just provided.

In an embodiment of the invention, the drive circuit comprises a DC-link for supplying the electric motor with electrical energy. At least one electrical storage means is then a component of the intermediate circuit. On a failure of the DC-link voltage, the at least one electrical storage means takes over the energy supply of the electric motor.

The electric motor can be configured as an AC current motor and is then fed by means of an inverter from the DC-link voltage. The inverter serves to regulate the motor speed.

The at least one storage means can expediently be charged by the supply voltage or by the DC-link voltage during regular operation. With a sufficient voltage supply, the at least one storage means is charged up to a specific voltage level. It is thus ensured that on a later voltage failure of the supply voltage or of the DC-link voltage sufficient electrical energy is available in the storage means.

A controller is ideally provided which recognizes a voltage failure of the supply voltage or of the DC-link voltage and switches over to the emergency supply of the electric motor by the at least one storage means in this case. This can be an active switching process of a specific component. There is alternatively the possibility that the at least one storage means is connected to the electric motor such that energy from the at least one storage means can be automatically provided to the electric motor on an interruption of the supply voltage.

The drive circuit can preferably be designed such that it continues to allow a stabilization of the DC-link voltage during any fluctuations which may occur in the supply voltage or in the DC-link voltage. The controller of the drive circuit can preferably be designed such that it recognizes a power or voltage interruption or a falling below of a predefined lower limit value of the DC-link voltage. In this case, electrical energy can automatically be provided from the at least one storage means to support the voltage supply of the electric motor. The DC-link voltage can thereby be kept almost constant.

The at least one air bearing electric motor can have at least one coupling means at the output side. It is expedient in this case if the controller of the drive circuit has corresponding means for actuating this coupling to switch the motor free of load in the case of an emergency, i.e. on a failure of the supply voltage or DC-link voltage. Ideal motor operating conditions are thereby created to be able to ensure a feeding of the motor from the storage means for as long as possible on a supply interruption.

The at least one electrical storage means can be a low voltage store or alternatively a high voltage store. Suitable embodiments of the electrical storage means comprise at least one double layer capacitor and/or at least one rechargeable chemical battery cell, for example an Li ion cell.

In a preferred embodiment, a measuring means can be provided for detecting the temperature of the at least one storage means. Ideally, the charging voltage of the at least one storage means can then be determined or restricted in dependence on the measured temperature. The service life of the capacitor cells is in particular dependent on the environmental temperature and the applied voltage on the use of double layer capacitors. The higher the temperature and the selected charge voltage, the more the service life of the cells is shortened. To decouple the service life of the cells from the environmental temperature, the store temperature is measured and the level of the charge voltage of the at least one storage means is adapted while taking account of the measured temperature.

The cell voltages are ideally reduced by approximately 0.1 V per 10° C. temperature increase. In this manner, the influence of the temperature on the cell service life is considerably compensated. The invention should, however, not be restricted to the listed example values.

If a low voltage store is used as the storage means, it can be connected to the supply voltage or to the DC-link via a bidirectional DC/DC converter. The DC/DC converter works in step-down operation for the charging process of the store by the DC-link voltage or the supply voltage. On a failure of the supply voltage, the DC/DC converter can be switched into step-up operation. The air bearing motor can then be supplied from the low voltage store. In this embodiment, the DC/DC converter has to be galvanically isolated between the low voltage store and the high voltage store.

In a simpler embodiment, the at least one storage means is designed as a high voltage store. In this case, a galvanic isolation of the bidirectional DC/DC converter is not necessary between the DC-link and the storage means, which produces a substantial simplification of the complexity of the overall system.

In a further advantageous embodiment of the invention, the at least one storage means is a high voltage store and is connected to the supply voltage or the DC-link via a unidirectional DC/DC converter. The DC/DC converter serves the charging of the at least one storage means with the supply voltage or the DC-link. The DC/DC converter preferably works in step-down operation in this respect.

The storage can furthermore be connected to the air bearing motor via a diode. On a failure of the supply voltage or of the DC-link voltage, the motor is automatically fed with electrical energy from the at least one storage means via the diode.

There is alternatively the possibility of dispensing with the use of a DC/DC converter. Instead of the unidirectional DC/DC converter, a resistor element is then used via which the at least one storage is connected to the supply voltage or to the DC-link. The charging current from the DC-link can be limited via the resistor element. There is the possibility of fixedly defining the resistance value in advance or to use a variable resistor element having an adjustable resistance value.

The charging of the storage means takes place via the resistor element, whereas the electric motor is fed from the storage via a diode on a failure of the supply voltage or of the DC-link voltage. The resistor element is expediently designed as a connected resistor element so that the charging process can be stopped as required, preferably when the storage voltage of the storage means has reached a predefined voltage level.

The provided controller serves the control of the DC/DC converter or the control of the resistor element. The controller optionally takes over the switching over of the bidirectional converter between step-up operation and step-down operation.

It is furthermore expedient if the at least one storage means can be monitored by the control and if its storage voltage can be detected. The control can actuate the DC/DC converter or the switchable resistor element in dependence on the measured storage voltage to control or interrupt the charging process in dependence on the storage voltage.

The controller is furthermore suitable to control or regulate the motor speed via an inverter connected upstream of the electric motor. The controller or regulator is consequently connected to a corresponding sensor system for detecting the motor speed.

In accordance with a further advantageous embodiment of the invention, the inverter can likewise be supplied with energy at least briefly by the at least one storage means on an interruption of the supply voltage/DC-link voltage. The inverter, for example, requires electrical energy for operating the driver circuit or sensor system. An embodiment of the drive circuit is preferred in which a DC/DC converter of low power is connected in parallel with the at least one storage means to provide the supply voltage required for the inverter during the interruption of the supply voltage/DC-link voltage from the at least one storage means and to secure an autonomous of the drive circuit.

In addition to the drive circuit, the invention relates to an air conditioning system having an air bearing motor for driving a compressor and a drive circuit in accordance with the present invention or an advantageous embodiment of the drive circuit. The air conditioning system is consequently characterized by the same advantages and properties as the drive circuit in accordance with the invention. A repeat description is therefore dispensed with.

The electric motor is preferably connected to the compressor via a coupling means which switches the electric motor load-free on an interruption of the supply voltage.

The air conditioning system in particular serves the use in rail vehicles, wherein the supply voltage is preferably provided by an overhead line.

BRIEF DESCRIPTION OF THE DRAWINGS

Further advantages and properties of the invention will be explained in the following with reference to a plurality of embodiments shown in the drawings. There are shown.

DESCRIPTION OF THE PREFERRED EMBODIMENTS

Figure 1:
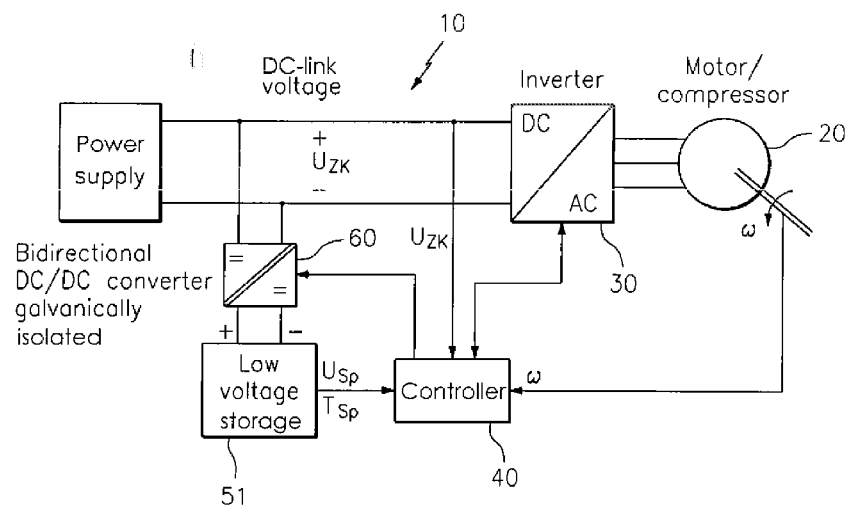
FIG. 1: a circuit diagram of a drive circuit for controlling an air bearing motor in accordance with a first embodiment in accordance with the invention.

All five circuit diagrams of FIGS. 1 to 5 show a drive circuit having DC-link 10 for the energy supply of the electric motor 20. The motor 20 is an electric motor having an aerodynamic bearing the motor shaft which serves the drive of an air conditioning compressor and is connected thereto via a coupling, not shown.

The electric motor 20 is an AC current motor. The inverter 30, which converts the DC voltage $U_{ZK}$ of the DC-link 10 into the required AC voltage for feeding the motor, is therefore connected upstream of the motor 20. In addition, the frequency of the generated AC voltage for regulating the speed of the motor 20 can be adjusted. The desired control of the inverter 30 takes place by the controller 40 of the drive circuit. The rotational speed ω of the motor serves as the regulation value which is measured at the motor shaft and which is transferred to the controller 40. The controller 40 then sets the required frequency of the inverter 30 in dependence on the desired speed.

The circuit design shown having an air bearing motor 20 for driving a compressor is frequently used in air conditioning systems for rail vehicles. The air conditioning system like other consumers, too, are fed inside the rail vehicle from the overhead line. The voltage supply can therefore be briefly interrupted at the transition points and can fail. Since the motor 20 has an aerodynamic bearing, the effect of the air bearing depends on the speed of the motor 20. If the speed falls below a critical limit value, there is a contact between the bearing counter-points and unwanted friction phenomena arise within the air bearing, whereby the service life is substantially reduced.

For this reason, in accordance with the invention, an electrical storage 50, 51 is integrated into the intermediate DC voltage circuit 10 so that the required energy can be provided during a voltage failure of the DC-link voltage $U_{ZK}$ for the disturbance-free operation of the air bearing motor 20. The electrical energy of the storage means 50, 51 ensures a minimum speed of the motor 20 to be able just to maintain the air pressure within the air bearing.

During the normal state, the air bearing motor is fed by the voltage supply system and the storage 50, 51 is simultaneously charged to the DC-link voltage $U_{ZK}$. If the DC-link voltage $U_{ZK}$ is interrupted for a brief period, for example at transition points of the overhead line, the controller 40 recognizes the voltage failure and switches the energy supply of the motor 20 to the storage 50, 51. The air bearing motor 20 is simultaneously decoupled from the load. This takes place by the output-side coupling, not shown, between the motor 20 and the compressor. Ideal operating conditions for the air bearing motor 20 are hereby provided to ensure a maximum supply duration of the motor 20 from the storage means and consequently a maintenance of the minimal speed for as long as possible.

The electrical storage 50, 51 can comprise a plurality of double layer capacitors or of rechargeable battery cells such as Li ion cells.

Various embodiment variants are suitable for the integration of the storage 50, 51 into the intermediate circuit which will be explained in more detail in the following with reference to FIGS. 1 to 4. However, a general definition for the dimensioning of the storage 50, 51 should be given beforehand. It is assumed that the minimal energy consumption of the motor 20 during the interruption time T is equal to E where the formula $$E = P \cdot T$$

applies and P represents the minimally required power so that the air bearing motor is in a secure operating state with a secure speed. The required storage capacity C is then calculated as follows:

$$E = P \cdot T = \frac{1}{2} C (U_{SP}^2 - U_{min}^2)$$

It follows from this:

$$C = \frac{2 P \cdot T}{U_{SP}^2 - U_{min}^2}$$

Where $U_{Sp}$ is the voltage of the store and $U_{min}$ is the minimally required DC-link voltage for a secure motor operation.

FIG. 1 now shows the block diagram of the drive system which is capable of emergency operation and in which the storage means is designed as a low voltage storage 51. The integration of the storage 51 in the DC-link 10 takes place via the bidirectional DC/DC converter 60 which moreover provides a galvanic separation between the DC-link voltage $U_{ZK}$ and the low voltage storage 51.

If the voltage supply system is in the normal state, this is recognized by the controller 40 and the motor is fed by the voltage supply, i.e. the DC-link voltage $U_{ZK}$, via the inverter 30. At the same time, the low voltage storage 51 is charged by the DC/DC converter 60, with this working as a step-down converter for this purpose and transforming the DC-link voltage $U_{ZK}$ with a higher volt figure into a lower DC voltage for the low voltage storage 51.

On a failure of the voltage supply or of the DC-link voltage $U_{ZK}$, the control 40 switches the DC/DC converter 60 into the step-up mode, whereby the low voltage of the storage 51 is stepped up and feeds the motor 20 via the inverter 30 with electrical energy for maintaining the minimum speed. The required DC-link voltage is provided by the storage 51 here.

Figure 2:
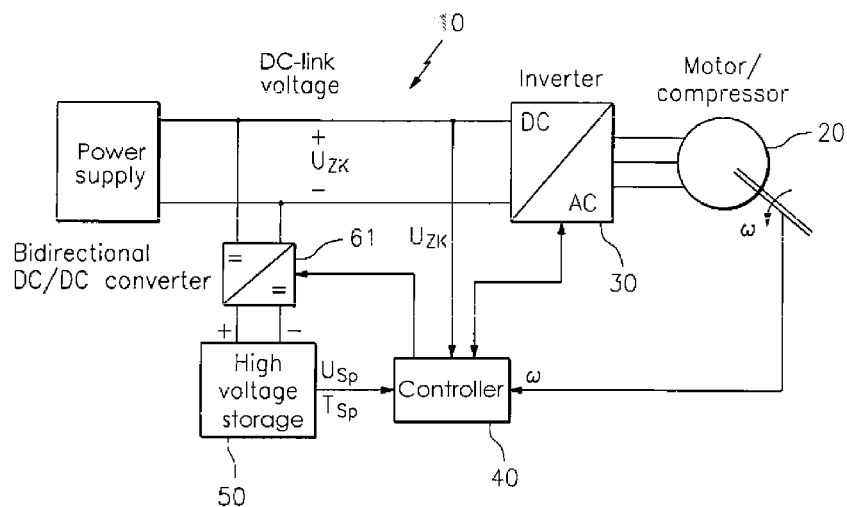
FIG. 2: the drive circuit in accordance with the invention in accordance with a second embodiment.

FIG. 2 shows an embodiment which is modified with respect to FIG. 1 and in which a high voltage storage 50 is now used instead of a low voltage storage 51. The switching design, in particular the integration of the storage 50 into the intermediate circuit 10, is simplified by the use of the high voltage storage 50. Due to the lower voltage difference, the bidirectional DC/DC converter 61 does not have to ensure any galvanic isolation between the DC-link voltage $U_{ZK}$ and the voltage level of the high voltage storage 50.

Figure 3:
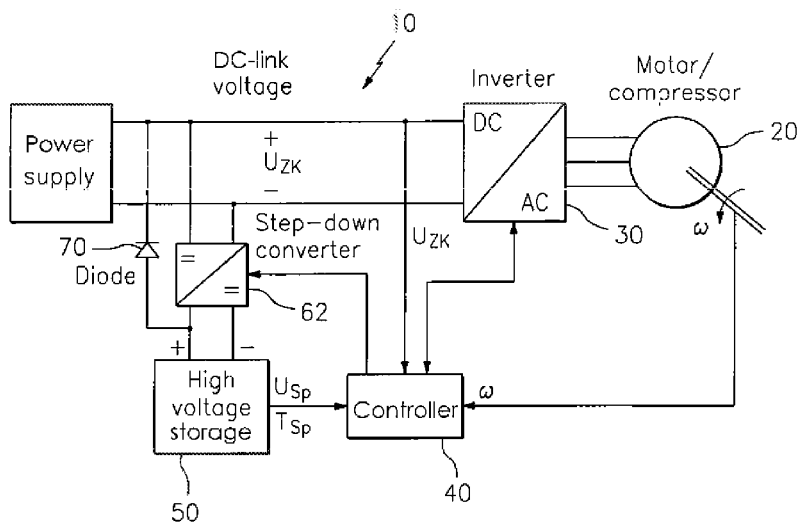
FIG. 3: the drive circuit in accordance with the invention in accordance with a third embodiment.

In the embodiment of FIG. 3, a high voltage storage 50 is likewise used as a storage means analog to FIG. 2. The DC/DC converter 62 now works only unidirectionally, and indeed in the step-down mode. The DC-link voltage $U_{ZK}$ is thereby set to the required voltage of the high voltage storage 50. In the embodiment shown, the storage 50 is consequently charged by the DC-link voltage $U_{ZK}$ during the normal operation until a predefined voltage level is reached. Once this voltage level is reached, the controller 40 switches off the DC/DC converter 62.

On the failure of the DC-link voltage $U_{ZK}$, the charging process is stopped and the air bearing motor 20 is automatically fed by the storage 50 via the diode 70 connected to the DC-link 10 in the direction of flow.

Figure 4:
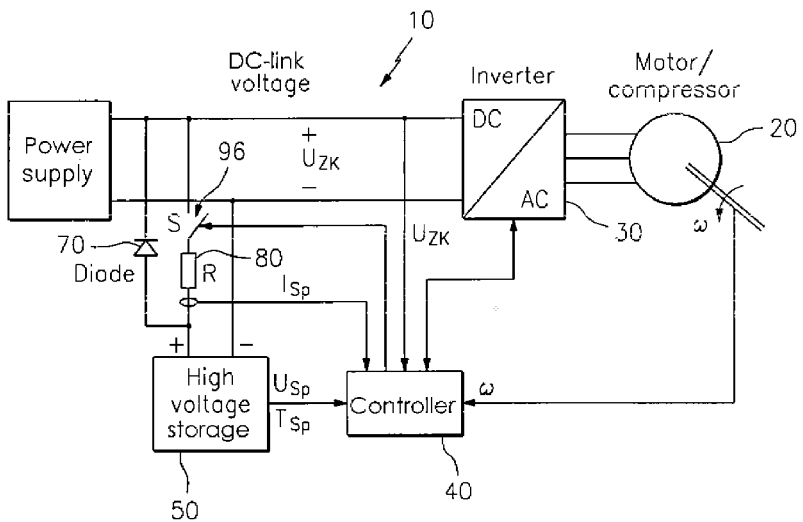
FIG. 4: the drive circuit in accordance with the invention in accordance with a fourth embodiment.

In the embodiment of FIG. 4, the use of a DC/DC converter is now completely dispensed with. Instead, the high voltage storage 50 is charged in normal operation via a resistor 80 by the DC-link voltage $U_{ZK}$. A switch 90 is connected upstream of the resistor 80 to be able to interrupt the charging process on reaching a predefined storage voltage of the high voltage storage 50. The controller 40 monitors the storage voltage $U_{Sp}$ and opens the switch 90 where necessary as soon as the desired voltage is reached. The charging process is then interrupted.

On the failure of the DC-link voltage $U_{ZK}$, the high voltage storage 50 automatically supplies the motor 20 with electrical energy via the diode 70 connected to the DC-link 10 in the direction of flow.

The resistor 80 limits the charging current during the charging phase, in particular when the storage is completely discharged. The resistance value R of the resistor 80 is calculated as follows:

$$R = \frac{U_{ZK}}{I_{SP\_Max}},$$

where $U_{ZK}$ is the DC-link voltage and $I_{Sp\_Max}$ is the maximum permitted charging current of the storage 50.

Figure 5:
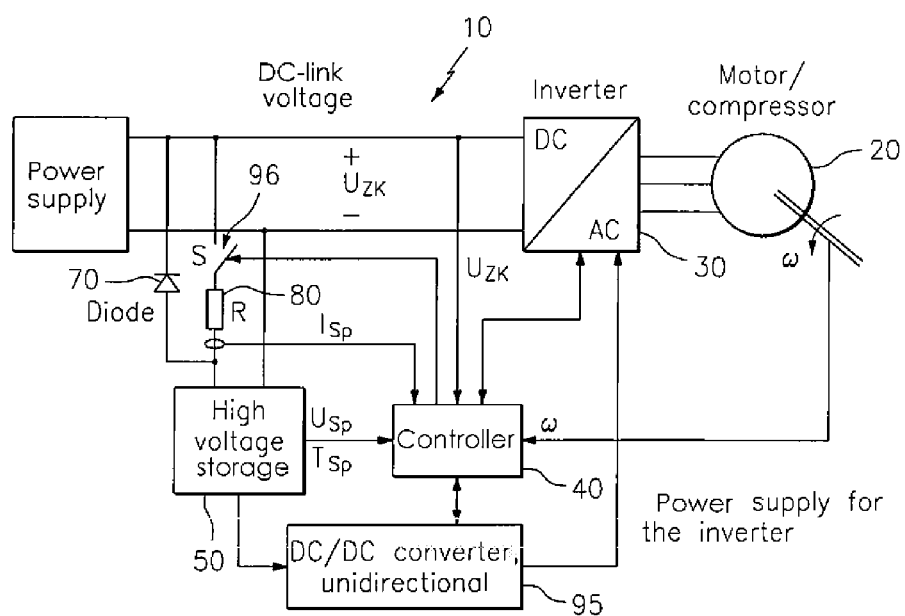
FIG. 5: the drive circuit in accordance with the invention in accordance with FIG. 4 with an extension to supply the inverter.

The embodiment in accordance with FIG. 5 substantially corresponds to that in accordance with FIG. 4. In addition, the DC/DC converter 95 of small power is connected in parallel to the high voltage storage 50 to provide the supply voltage required for the inverter 30 for the operation of the internal driver circuit as well as the sensor system during an interruption of the DC-link voltage and to secure an autonomous operation of the drive circuit.

The invention claimed is:

1. A drive circuit for an aerodynamic bearing electric motor having an aerodynamic bearing of the motor shaft, the drive circuit comprising:
   a power supply for providing a supply voltage or DC-link voltage to an inverter for driving the aerodynamic bearing electric motor;
   at least one means for storing electrical energy by which the aerodynamic bearing electric motor is supplied with electrical energy on a failure of the supply voltage or DC-link voltage to control the inverter to obtain a minimum speed of the motor shaft required for the aerodynamic bearing electric motor; and
   a controller for monitoring the rotational speed of the aerodynamic bearing electric motor shaft, and the supply voltage or DC-link voltage to supply the aerodynamic bearing electric motor with electrical energy from the at least one means for storing electrical energy upon the failure of the supply voltage or DC-link voltage to control the inverter to obtain the minimum speed of the aerodynamic bearing motor shaft required for the aerodynamic bearing electric motor.

2. A drive circuit in accordance with claim 1, wherein the at least one storage means can be charged by the supply voltage or DC-link voltage.

3. A drive circuit in accordance with claim 2, wherein means are provided for measuring the temperature of the at least one storage means and the charging voltage of the at least one storage means can be selected in dependence on the measured temperature.

4. A drive circuit in accordance with claim 1, wherein the controller is provided which recognizes a voltage failure and switches to the emergency supply of the electric motor by the at least one storage means.

5. A drive circuit in accordance with claim 1, wherein the controller is provided which recognizes a falling below of a minimum voltage by the supply voltage/DC-link voltage and connects the at least one storage means to keep the DC-link voltage constantly over the minimum value.

6. A drive circuit in accordance with claim 1, wherein the controller actuates a coupling of the electric motor at the output side on a voltage failure to switch the motor load-free.

7. A drive circuit in accordance with claim 1, wherein the at least one electrical storage means comprises a low voltage storage or a high voltage storage.

8. A drive circuit in accordance with claim 1, wherein the at least one electrical storage means comprises at least one double layer capacitor and/or at least one rechargeable chemical battery cell, in particular an Li ion cell.

9. A drive circuit in accordance with claim 1, wherein the at least one storage means comprises a low voltage storage and is connected to the supply voltage or to the DC-link via a bidirectional galvanically isolated DC/DC converter.

10. A drive circuit in accordance with claim 1, wherein the at least one storage means comprises a high voltage storage and is connected to the supply voltage or to the DC-link via a bidirectional DC/DC converter not galvanically isolated.

11. A drive circuit in accordance with claim 1, wherein the at least one storage means comprises a high voltage storage and is connected to the supply voltage or to the DC-link for charging the storage means via a unidirectional DC/DC converter and the store feeds the electric motor via a diode on a failure of the supply voltage/DC-link voltage.

12. A drive circuit in accordance with claim 1, wherein the at least one storage means comprises a high voltage storage and is connected via a resistor element, in particular a connected resistor element, to the supply voltage or to the DC-link for charging the storage means and the state feeds the electric motor via a diode on a failure of the supply voltage/DC-link voltage.

13. A drive circuit in accordance with claim 1, wherein the charge state of the at least one storage means can be monitored by the controller and the DC/DC converter or the switchable resistor element can be controlled by the controller in dependence on the charge state.

14. A drive circuit in accordance with claim 1, wherein the electric motor is fed via an inverter by the supply voltage/DC-link voltage and the inverter can preferably be controlled or regulated by the control in dependence on the detected motor speed.

15. A drive circuit in accordance with claim 14, wherein the inverter is or can be connected to the at least one storage means, in particular via a DC/DC converter, to ensure an emergency supply of the inverter on a failure of the supply voltage/DC-link voltage.

16. An air-conditioning system, in particular for a rail vehicle, comprising an air bearing electric motor for driving a compressor and a drive circuit in accordance with claim 1.

17. An air-conditioning system in accordance with claim 16, wherein the electric motor is connected to the compressor via at least one coupling means and can be decoupled from the compressor at the output side on a failure of the supply voltage/DC-link voltage.

18. A drive circuit in accordance with claim 3, wherein the controller is provided which recognizes a voltage failure and switches to the emergency supply of the electric motor by the at least one storage means.

19. A drive circuit in accordance with claim 2, wherein the controller is provided which recognizes a voltage failure and switches to the emergency supply of the electric motor by the at least one storage means.

20. A drive circuit in accordance with claim 18, wherein the controller is provided which recognizes a falling below of a minimum voltage by the supply voltage/DC-link voltage and connects the at least one storage means to keep the DC-link voltage constantly over the minimum value.

* * * * *